(12) United States Patent
Lv et al.

(10) Patent No.: US 11,412,468 B2
(45) Date of Patent: Aug. 9, 2022

(54) METHOD FOR SYNCHRONIZING NETWORK DEVICE, AND NETWORK DEVICE

(71) Applicant: Huawei Technologies Co., Ltd., Shenzhen (CN)

(72) Inventors: Jingfei Lv, Wuhan (CN); Yawei Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 16/904,051

(22) Filed: Jun. 17, 2020

(65) Prior Publication Data
US 2020/0322906 A1 Oct. 8, 2020

Related U.S. Application Data

(63) Continuation of application No. PCT/CN2017/116955, filed on Dec. 18, 2017.

(51) Int. Cl.
*H04W 56/00* (2009.01)
(52) U.S. Cl.
CPC ............... *H04W 56/001* (2013.01)
(58) Field of Classification Search
CPC ... H04W 56/001; H04J 3/0641; H04J 3/0658; H04J 3/0638
See application file for complete search history.

(56) References Cited

U.S. PATENT DOCUMENTS

| 2004/0148437 A1 | 7/2004 | Tonanaka |
| 2009/0207863 A1 | 8/2009 | Cheng et al. |
| (Continued) | | |

FOREIGN PATENT DOCUMENTS

| CN | 101043316 A | 9/2007 |
| CN | 101299749 A | 11/2008 |
| CN | 102006158 A | 4/2011 |
| (Continued) | | |

OTHER PUBLICATIONS

ITU-T G.8264/Y.1364, "Series G: Transmission Systems and Media, Digital Systems and Networks Packet over Transport aspects; Synchronization, quality and availability targets Series Y: Global Information Infrastructure, Internet Protocol Aspects and Next-Generation Networks Internet protocol aspects—Transport", Distribution of timing information through packet networks, May 2014, 40 pages.

(Continued)

*Primary Examiner* — Kyaw Z Soe
(74) *Attorney, Agent, or Firm* — Conley Rose, P.C.

(57) ABSTRACT

A method for synchronizing a network device includes: receiving, by the network device, a first SSM and a second SSM, where the first SSM carries a first SSM code for indicating a quality level of a first clock source and a first eSSM code for indicating the quality level of the first clock source, and the second SSM carries a second SSM code for indicating a quality level of a second clock source and a second eSSM code for indicating the quality level of the second clock source. When a value of the first SSM code is less than a value of the second SSM code, the network device calibrates a frequency of the network device based on a timing signal of the first clock source.

20 Claims, 4 Drawing Sheets

---

A network device receives a first synchronization status message and a second synchronization status message      S301

When a value of a first SSM code is less than a value of a second SSM code, the network device calibrates a frequency of the network device based on a timing signal of the first clock source      S302

(56) References Cited

U.S. PATENT DOCUMENTS

2010/0329284 A1 12/2010 Wong et al.
2021/0367693 A1* 11/2021 S .............................. H04L 7/033

FOREIGN PATENT DOCUMENTS

| CN | 102130766 A | 7/2011 |
| EP | 2391061 A1 | 11/2011 |
| WO | 1992016895 A1 | 10/1992 |

OTHER PUBLICATIONS

ITU-T G.8264/Y.1364 "Series G: Transmission Systems and Media, Digital Systems and Networks Packet over Transport aspects; Synchronization, quality and availability targets Series Y: Global Information Infrastructure, Internet Protocol Aspects and Next-Generation Networks, Internet of Things and Smart Cities", Distribution of timing information through packet networks Amendment 2, Apr. 2016, 8 pages.

Recommendation ITU-T G.781, Series G: Transmission Systems and Media, Digital Systems and Networks Digital terminal equipments—Principal characteristics of multiplexing equipment for the synchronous digital hierarchy; Synchronization layer functions Sep. 2008, 124 pages.

"Series G: Transmission Systems and Media, Digital Systems and Networks, Packet over Transport aspects—Synchronization, quality and availability targets, Series Y: Global Information Infrastructure, Internet Protocol Aspects, Next-Generation Networks, Internet of Things and Smart Cities, Internet protocol aspects—Transport, Distribution of timing information through packet networks," ITU-T, G.8264/Y.1364, Aug. 2017, 42 pages.

* cited by examiner

METHOD FOR SYNCHRONIZING NETWORK DEVICE, AND NETWORK DEVICE

CROSS-REFERENCE TO RELATED APPLICATIONS

This is a continuation of Int'l Patent App. No. PCT/CN2017/116955 filed on Dec. 18, 2017, which is incorporated by reference.

TECHNICAL FIELD

The present disclosure relates to the field of communications technologies, and in particular, to a method for synchronizing a network device, and a network device.

BACKGROUND

A format of a quality-level type-length-value (QL TLV) is defined in G.8264/Y.1364, May 2014, released by the International Telecommunication Union Telecommunication Standardization Sector (ITU-T). A synchronization status message (SSM) code may be carried in the QL TLV. A format of an extended QL TLV is defined in G.8264/Y.1364 Amendment 2, April 2016, released by the ITU-T. An enhanced SSM (eSSM) code may be carried in the extended QL TLV. When a network device receives a plurality of messages that comply with G.8264/Y.1364 Amendment 2 and are separately used to indicate quality levels of different clock sources, G.8264/Y.1364 Amendment 2 does not specify how to select a clock source for tracking from a plurality of clock sources. As a result, the network device cannot select a clock source (synchronization source) having relatively high synchronization precision from the plurality of clock sources.

SUMMARY

This disclosure provides a method for synchronizing a network device, a network device, a computer program product, and a system. According to the foregoing technical solutions, the network device can select a clock source having relatively high synchronization precision.

According to a first aspect, a method for synchronizing a network device is provided.

The method includes: receiving, by the network device, a first SSM and a second SSM, where the first SSM carries a first SSM code for indicating a quality level of a first clock source and a first eSSM code for indicating the quality level of the first clock source, and the second SSM carries a second SSM code for indicating a quality level of a second clock source and a second eSSM code for indicating the quality level of the second clock source.

The method further includes: calibrating, by the network device, a frequency of the network device based on a timing signal of the first clock source when a value of the first SSM code is less than a value of the second SSM code.

G.8264/Y.1364 defines a set of clock quality levels. For example, the clock quality levels defined by G.8264/Y.1364 include quality level—primary reference clock (QL-PRC), quality level—type I or V slave clock (QL-SSU-A), quality level—type VI slave clock (QL-SSU-B), quality level—synchronous equipment clock (QL-SEC), and quality level—do not use (QL-DNU). For QL-PRC, QL-SSU-A, QL-SSU-B, QL-SEC, and QL-DNU. Refer to G.781 and G.8264. In addition, according to G.8264/Y.1364, a smaller value of an SSM code corresponds to a higher quality level of a clock source.

When the value of the first SSM code is less than the value of the second SSM code, the quality level of the first clock source is higher than the quality level of the second clock source. Therefore, in comparison with tracking the second clock source, the network device can obtain a frequency with higher precision by tracking the first clock source.

In addition, G.8264/Y.1364 Amendment 2 defines an eSSM code. When a quality level of a clock source is a clock quality level defined by G.781, a value of an eSSM code for indicating the quality level of the clock source is equal to 0xFF. For example, assuming that the quality level of the first clock source is QL-EEC1 and the quality level of the second clock source is QL-PRC, a value of an SSM code corresponding to the first clock source is equal to 0xB, and a value of an SSM code corresponding to the second clock source is equal to 0x2. A value of an eSSM code corresponding to the first clock source is equal to 0xFF, and a value of an eSSM code corresponding to the second clock source is equal to 0xFF. To be specific, if the network device supports only G.8264/Y.1364 and does not support G.8264/Y.1364 Amendment 2, the network device determines, based on a fact that the value of the first SSM code is greater than the value of the second SSM code, that the quality level of the first clock source is lower than the quality level of the second clock source. However, if the network device supports only specification of the eSSM code in G.8264/Y.1364 Amendment 2 and does not support a specification of the SSM code in G.8264/Y.1364, the network device determines, based on a fact that a value of the first eSSM code is equal to a value of the second eSSM code, that the quality level of the first clock source is the same as the quality level of the second clock source. To be specific, although quality levels of the first clock source and the second clock source are actually different, if determining is based only on the values of the eSSM codes, the quality levels of the first clock source and the second clock source are the same.

Based on the foregoing analysis, when the value of the first SSM code is different from the value of the second SSM code, in comparison with determining a to-be-tracked clock source based on the values of the eSSM codes, the network device can track a clock source with higher precision by determining a to-be-tracked clock source based on the values of the SSM codes. Specifically, when the value of the first SSM code is less than the value of the second SSM code, it is determined that a clock source corresponding to an SSM code having a smaller value, that is, the first clock source, is the to-be-tracked clock source, so that the network device can track a clock source with higher precision.

Optionally, in the foregoing technical solution, the method further includes: calibrating, by the network device, the frequency of the network device based on the timing signal of the first clock source when the value of the first SSM code is equal to the value of the second SSM code and the value of the first eSSM code is less than the value of the second eSSM code.

When the value of the first SSM code is equal to the value of the second SSM code, if determining is based only on the values of the SSM codes, the quality level of the first clock source is equal to the quality level of the second clock source. However, the quality level of the first clock source is actually higher than the quality level of the second clock source.

Therefore, in the foregoing technical solution, when the value of the first SSM code is equal to the value of the second SSM code, the clock source with higher precision can be determined based on the values of the eSSM codes.

Optionally, in the foregoing technical solution, the method further includes: calibrating, by the network device, the frequency of the network device based on the timing signal of the first clock source when the value of the first SSM code is equal to the value of the second SSM code, the value of the first eSSM code is equal to the value of the second eSSM code, and a value of the number of cascaded synchronous Ethernet equipment clocks (EECs) from a nearest synchronization supply unit/primary reference clock (SSU/PRC) in the first SSM is less than a value of the number of cascaded synchronous Ethernet equipment clocks from the nearest synchronization supply unit/primary reference clock in the second SSM.

In the foregoing technical solution, when the value of the first SSM code is equal to the value of the second SSM code and the value of the first eSSM code is equal to the value of the second eSSM code, the network device can select, from a plurality of clock sources, a clock source for calibrating the frequency of the network device, to avoid a failure to determine the clock source. For example, the failure to determine the clock source may result in low precision of a clock of the network device, and may even result in a service interruption of the network device.

Optionally, in the foregoing solution, the method further includes: calibrating, by the network device, the frequency of the network device based on the timing signal of the first clock source when the value of the first SSM code is equal to the value of the second SSM code, the value of the first eSSM code is equal to the value of the second eSSM code, the value of the number of cascaded synchronous Ethernet equipment clocks from the nearest synchronization supply unit/primary reference clock in the first SSM is equal to the value of the number of cascaded synchronous Ethernet equipment clocks from the nearest synchronization supply unit/primary reference clock in the second SSM, and a value of the number of cascaded enhanced synchronous Ethernet equipment clocks from the nearest SSU/PRC in the first SSM is less than a value of the number of cascaded enhanced synchronous Ethernet equipment clocks from the nearest synchronization supply unit/primary reference clock in the second SSM.

Optionally, in the foregoing technical solution, the method further includes: calibrating, by the network device, the frequency of the network device based on the timing signal of the first clock source when the value of the first SSM code is equal to the value of the second SSM code, the value of the first eSSM code is equal to the value of the second eSSM code, the value of the number of cascaded synchronous Ethernet equipment clocks from the nearest synchronization supply unit/primary reference clock in the first SSM is equal to the value of the number of cascaded synchronous Ethernet equipment clocks from the nearest synchronization supply unit/primary reference clock in the second SSM, the value of the number of cascaded enhanced synchronous Ethernet equipment clocks from the nearest synchronization supply unit/primary reference clock in the first SSM is equal to the value of the number of cascaded enhanced synchronous Ethernet equipment clocks from the nearest synchronization supply unit/primary reference clock in the second SSM, and a value of a synchronous Ethernet master identity (SyncE master ID) in the first SSM is less than a value of a SyncE Master ID in the second SSM.

According to a second aspect, a network device is provided. The network device includes a receiving unit and a calibration unit.

The receiving unit is configured to receive a first SSM and a second SSM, where the first SSM carries a first SSM code for indicating a quality level of a first clock source and a first eSSM code for indicating the quality level of the first clock source, and the second SSM carries a second SSM code for indicating a quality level of a second clock source and a second eSSM code for indicating the quality level of the second clock source.

The calibration unit is configured to calibrate a frequency of the network device based on a timing signal of the first clock source when a value of the first SSM code is less than a value of the second SSM code.

Optionally, in the foregoing technical solution, the calibration unit is further configured to calibrate the frequency of the network device based on the timing signal of the first clock source when the value of the first SSM code is equal to the value of the second SSM code and the value of the first eSSM code is less than the value of the second eSSM code.

Optionally, in the foregoing technical solution, the calibration unit is further configured to calibrate the frequency of the network device based on the timing signal of the first clock source when the value of the first SSM code is equal to the value of the second SSM code, the value of the first eSSM code is equal to the value of the second eSSM code, and a value of the number of cascaded synchronous Ethernet equipment clocks from a nearest synchronization supply unit/primary reference clock in the first SSM is less than a value of the number of cascaded synchronous Ethernet equipment clocks from the nearest synchronization supply unit/primary reference clock in the second SSM.

Optionally, in the foregoing technical solution, the calibration unit is further configured to calibrate the frequency of the network device based on the timing signal of the first clock source when the value of the first SSM code is equal to the value of the second SSM code, the value of the first eSSM code is equal to the value of the second eSSM code, the value of the number of cascaded synchronous Ethernet equipment clocks from the nearest synchronization supply unit/primary reference clock in the first SSM is equal to the value of the number of cascaded synchronous Ethernet equipment clocks from the nearest synchronization supply unit/primary reference clock in the second SSM, and a value of the number of cascaded enhanced synchronous Ethernet equipment clocks from the nearest synchronization supply unit/primary reference clock in the first SSM is less than a value of the number of cascaded enhanced synchronous Ethernet equipment clocks from the nearest synchronization supply unit/primary reference clock in the second SSM.

Optionally, in the foregoing technical solution, the calibration unit is further configured to calibrate the frequency of the network device based on the timing signal of the first clock source when the value of the first SSM code is equal to the value of the second SSM code, the value of the first eSSM code is equal to the value of the second eSSM code, the value of the number of cascaded synchronous Ethernet equipment clocks from the nearest synchronization supply unit/primary reference clock in the first SSM is equal to the value of the number of cascaded synchronous Ethernet equipment clocks from the nearest synchronization supply unit/primary reference clock in the second SSM, the value of the number of cascaded enhanced synchronous Ethernet equipment clocks from the nearest synchronization supply unit/primary reference clock in the first SSM is equal to the value of the number of cascaded enhanced synchronous Ethernet equipment clocks from the nearest synchronization supply unit/primary reference clock in the second SSM, and a value of a SyncE Master ID in the first SSM is less than a value of a SyncE Master ID in the second SSM.

According to a third aspect, a network device is provided. The network device includes a transceiver, a processor, and a memory. The transceiver is coupled to the processor, the processor is coupled to the memory, and the memory stores a computer program.

The transceiver is configured to receive a first SSM and a second SSM, where the first SSM carries a first SSM code for indicating a quality level of a first clock source and a first eSSM code for indicating the quality level of the first clock source, and the second SSM carries a second SSM code for indicating a quality level of a second clock source and a second eSSM code for indicating the quality level of the second clock source.

When the computer program in the memory is executed, the processor is enabled to calibrate a frequency of the network device based on a timing signal of the first clock source when a value of the first SSM code is less than a value of the second SSM code.

Optionally, in the foregoing technical solution, when the computer program in the memory is executed, the processor is further enabled to calibrate the frequency of the network device based on the timing signal of the first clock source when the value of the first SSM code is equal to the value of the second SSM code and the value of the first eSSM code is less than the value of the second eSSM code.

Optionally, in the foregoing technical solution, when the computer program in the memory is executed, the processor is further enabled to calibrate the frequency of the network device based on the timing signal of the first clock source when the value of the first SSM code is equal to the value of the second SSM code, the value of the first eSSM code is equal to the value of the second eSSM code, and a value of the number of cascaded synchronous Ethernet equipment clocks from a nearest synchronization supply unit/primary reference clock in the first SSM is less than a value of the number of cascaded synchronous Ethernet equipment clocks from the nearest synchronization supply unit/primary reference clock in the second SSM.

Optionally, in the foregoing technical solution, when the computer program in the memory is executed, the processor is further enabled to calibrate the frequency of the network device based on the timing signal of the first clock source when the value of the first SSM code is equal to the value of the second SSM code, the value of the first eSSM code is equal to the value of the second eSSM code, the value of the number of cascaded synchronous Ethernet equipment clocks from the nearest synchronization supply unit/primary reference clock in the first SSM is equal to the value of the number of cascaded synchronous Ethernet equipment clocks from the nearest synchronization supply unit/primary reference clock in the second SSM, and a value of the number of cascaded enhanced synchronous Ethernet equipment clocks from the nearest synchronization supply unit/primary reference clock in the first SSM is less than a value of the number of cascaded enhanced synchronous Ethernet equipment clocks from the nearest synchronization supply unit/primary reference clock in the second SSM.

Optionally, in the foregoing technical solution, when the computer program in the memory is executed, the processor is further enabled to calibrate the frequency of the network device based on the timing signal of the first clock source when the value of the first SSM code is equal to the value of the second SSM code, the value of the first eSSM code is equal to the value of the second eSSM code, the value of the number of cascaded synchronous Ethernet equipment clocks from the nearest synchronization supply unit/primary reference clock in the first SSM is equal to the value of the number of cascaded synchronous Ethernet equipment clocks from the nearest synchronization supply unit/primary reference clock in the second SSM, the value of the number of cascaded enhanced synchronous Ethernet equipment clocks from the nearest synchronization supply unit/primary reference clock in the first SSM is equal to the value of the number of cascaded enhanced synchronous Ethernet equipment clocks from the nearest synchronization supply unit/primary reference clock in the second SSM, and a value of a SyncE Master ID in the first SSM is less than a value of a SyncE Master ID in the second SSM.

According to a fourth aspect, a computer program product is provided. The computer program product is stored in a non-volatile computer readable storage medium or a volatile computer readable storage medium. When the computer program is executed, a computer or a processor is enabled to perform a method provided in the first aspect.

According to a fifth aspect, a computer readable storage medium is provided, and the computer readable storage medium may be a non-volatile computer readable storage medium or a volatile computer readable storage medium. The computer readable storage medium stores a computer program or code, and when the computer program or the code is executed, a computer or a processor is enabled to perform a method provided in the first aspect.

According to a sixth aspect, a system is provided. The system includes a first clock source, a second clock source, and a network device provided in the second aspect or the third aspect.

DESCRIPTION OF EMBODIMENTS

G.8264/Y.1364 is a standard released by ITU-T in May 2014. G.8264/Y.1364 Amendment 2 is a standard released by ITU-T in April 2016. G.781 is a standard released by ITU-T in September 2008.

The following describes technical solutions with reference to the accompanying drawings.

Figure 1:
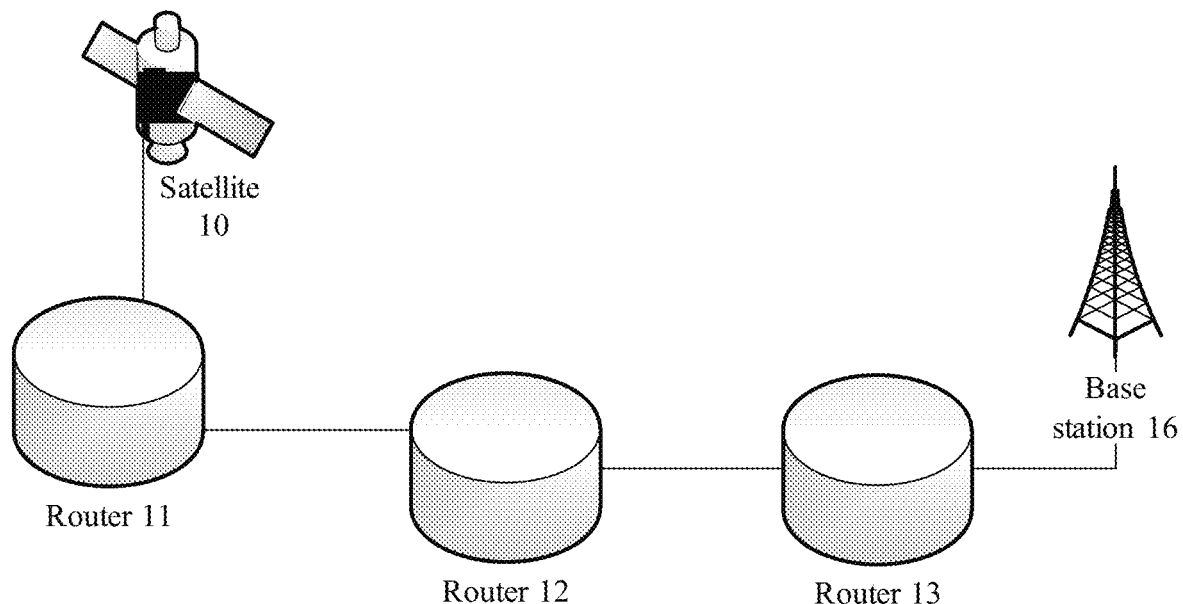
FIG. 1 is a schematic diagram of a clock synchronization network.

FIG. 1 is a schematic diagram of a clock synchronization network according to an embodiment. The clock synchronization network includes a satellite 10, a router 11, a router 12, a router 13, and a base station 16. The satellite 10 may be a Global Positioning System (GPS) satellite. Alternatively, the satellite 10 may be a Global Navigation Satellite System (GLONASS) satellite or a BeiDou Navigation Satellite System satellite. The GPS satellite is used as an example in this embodiment. The router 11 may be a provider router. The router 12 may be a provider edge router. The router 13 may be a customer edge router. The router 11, the router 12, and the router 13 may provide a virtual private network (VPN) service. For example, the VPN service may be a Layer 2 VPN (L2VPN) service. It may be understood that, when the router 11, the router 12, and the router 13 provide the L2VPN service, another network device not shown in FIG. 1, for example a host, may be present. The host may be a laptop computer or a desktop computer. The base station 16 is a network device in a cellular network. For example, the base station 16 may be a NodeB. The base station 16 can provide a wireless access service. It may be understood that, when the base station 16 provides the wireless access service, another network device not shown in FIG. 1, for example a user equipment (UE), may be present. The user equipment may be a cellular phone.

In the clock synchronization network shown in FIG. 1, the satellite 10 is upstream of the clock synchronization network, and the base station 16 is downstream of the clock synchronization network. An upstream device may send a clock signal to a downstream device by using the clock synchronization network. Specifically, the satellite 10 may perform a clock synchronization operation for the router 11. The satellite 10 may be the GPS satellite. Specifically, the router 11 may include a building integrated timing supply (BITS) clock. The BITS clock includes a GPS receiver. The satellite 10 may include an atomic clock. The satellite 10 may be driven by the atomic clock to send a GPS signal to the router 11. The GPS signal may include time data having the same precision as the atomic clock. After receiving the GPS signal, the GPS receiver in the router 11 may synchronize a clock in the router 11 to the atomic clock in the GPS satellite based on the time data in the GPS signal. Specifically, the router 11 may synchronize time of the clock in the router 11 to time of the atomic clock in the GPS satellite. In addition, the router 11 may synchronize a frequency of the clock in the router 11 to a frequency of the atomic clock in the GPS satellite. In the foregoing process, the BITS clock may be a primary reference time clock (PRTC). After the clock of the router 11 is calibrated, the router 11 may be used as a clock source to send timing information to another device, to calibrate clock of the another device. The clock source may also be referred to as a synchronization source. For example, the router 11 may be a clock source supporting G.8264/Y.1364 Amendment 2. For example, when a quality level of the BITS clock included in the router 11 is QL-PRTC, the router 11 may send an SSM to another device. A value of an eSSM code included in the SSM is equal to 0x20. When a quality level of the BITS clock included in the router 11 is QL-ePRTC, the router 11 may send an SSM to another device. A value of the eSSM code included in the SSM is equal to 0x21. If another device also supports G.8264/Y.1364 Amendment 2, the another device may determine, based on an eSSM code in the received SSM, that a quality level of the router 11 is QL-PRTC or QL-ePRTC.

After the clock of the router 11 is calibrated, the router 11 may be used as a clock source of the another device. Specifically, the router 11 may be used as a clock source to calibrate the clock of the another device. For example, both the router 11 and the router 12 may be devices that comply with G.8264/Y.1364 Amendment 2. The router 11 may calibrate a frequency of a clock of the router 12 based on G.8264/Y.1364 Amendment 2. Similarly, the router 12 may be used as a clock source to calibrate a clock of the router 13. The router 13 may be used as a clock source to calibrate a clock of the base station 16. In the foregoing process, the router 11 may be considered as a clock source of the router 13. If the router 12 stops tracking the router 11, that is, when the router 12 is used as a free running clock, the router 12 may be considered as a clock source of the router 13.

In the foregoing solution, the router 11, the router 12, and the router 13 are located in a fixed network. The base station 16 is located in the cellular network. The router 13 may be located at the edge of the fixed network. Before the router 13 calibrates a frequency and time of a local clock of the base station 16, the router 13 needs to track a frequency and time of the router 12, and synchronize a local clock of the router 13 with the frequency and the time of the clock of the router 12 that is used as the clock source.

Figure 2:
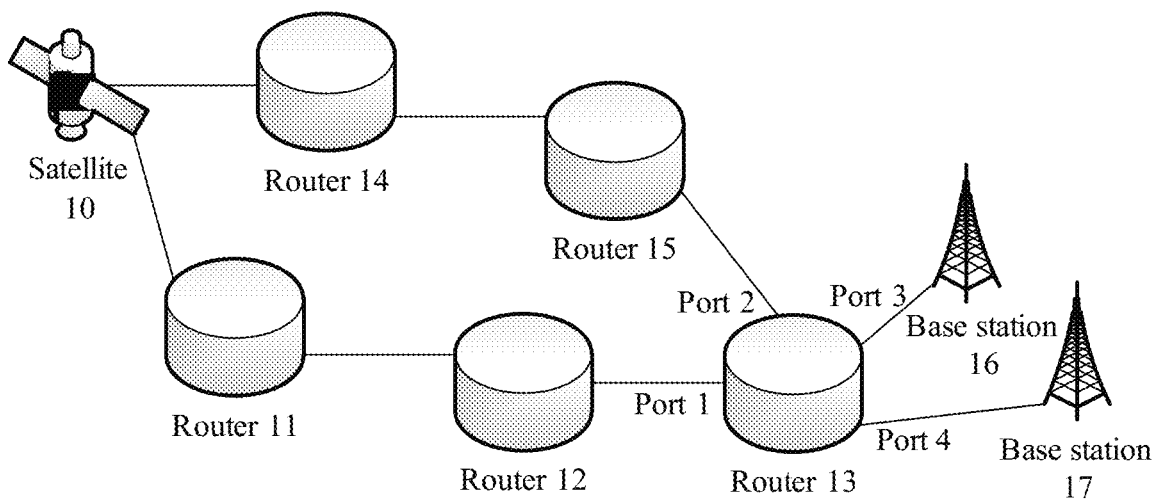
FIG. 2 is a schematic diagram of a clock synchronization network.

FIG. 2 is a schematic diagram of a clock synchronization network according to an embodiment. The technical solution shown in FIG. 2 may be obtained through extension based on the clock synchronization network shown in FIG. 1. For content not mentioned in this embodiment, refer to the description of the embodiment corresponding to FIG. 1. The following mainly describes a difference between the technical solution shown in FIG. 2 and the technical solution shown in FIG. 1. The clock synchronization network shown in FIG. 2 includes a satellite 10, a router 11, a router 12, a router 13, a router 14, a router 15, a base station 16, and a base station 17. In comparison with FIG. 1, the clock synchronization network shown in FIG. 2 further includes the router 14, the router 15, and the base station 17. The router 14 may be a provider router. The router 15 may be a provider edge router. The base station 17 is a network device in a cellular network.

The satellite 10 may perform a clock synchronization operation for the router 14. For a process of performing the clock synchronization operation by the satellite 10 for the router 14, refer to the foregoing description of performing the clock synchronization operation by the satellite 10 for the router 11. Details are not described herein. After a clock of the router 14 is calibrated, the router 14 may be used as a clock source to calibrate clock of another device. For example, the router 14 supports G.8264/Y.1364. A quality level of the router 14 is QL-PRTC. The router 14 may calibrate a frequency of a clock of the router 15 based on G.8264/Y.1364. The router 15 supports G.8264/Y.1364 and does not support G.8264/Y.1364 Amendment 2. A quality level of the router 15 is QL-EEC1 or QL-EEC2. Therefore, when the router 15 tracks the router 14, a quality level indicated by an SSM code included in an SSM sent by the router 15 to a downstream device (for example, the router 13) in the clock synchronization network is QL-PRC. When the router 15 is a free running clock, a quality level indicated by an SSM code included in an SSM sent by the router 15 to a downstream device (for example, the router 13) is QL-EEC1 or QL-EEC2.

According to FIG. 2, the router 13 is coupled to the router 12. The router 13 is coupled to the router 15. The router 13 is coupled to the base station 16. The router 13 is coupled to the base station 17. Specifically, the router 13 includes a port 1, a port 2, a port 3, and a port 4. The port 1, the port 2, the port 3, and the port 4 may all be Ethernet ports. The Ethernet port may be a fast Ethernet port, a Gigabit Ethernet port, or a higher rate Ethernet port. The router 13 may be coupled to the router 12 by using the port 1. The router 13 may be coupled to the router 15 by using the port 2. The router 13 may be coupled to the base station 16 by using the port 3. The router 13 may be coupled to the base station 17 by using the port 4. The router 13 may receive information about the clock source router 12 and router 15 through the port 1 and the port 2, respectively.

Specifically, the router 15 supports G.8264/Y.1364 and does not support G.8264/Y.1364 Amendment 2. When the router 15 is the free running clock, the router 13 receives, through the port 2, an SSM sent by the router 15. An SSM code included in the SSM sent by the router 15 indicates the quality level of the clock source (the router 15). For example, a value of the SSM code is 0xB, which indicates that the quality level of the router 15 is QL-EEC1. Because the router 15 does not support G.8264/Y.1364 Amendment 2, the SSM sent by the router 15 does not include an eSSM code. That is, the SSM sent by the router 15 does not include the eSSM code for indicating the quality level of the clock source (the router 15).

Specifically, the router 12 supports G.8264/Y.1364 and G.8264/Y.1364 Amendment 2. When the router 12 tracks the router 11, the router 13 receives, through the port 1, an SSM sent by the router 12. An SSM code included in the SSM sent by the router 12 indicates a quality level of a clock source (the router 11). For example, a value of the SSM code is 0x2, which indicates that the quality level of the router 15 is QL-PRC. Because the router 12 supports G.8264/Y.1364 Amendment 2, the SSM sent by the router 12 includes an eSSM code. The eSSM code included in the SSM sent by the router 12 indicates a quality level of a clock source (the router 12). For example, a value of the eSSM code is 0x20, which indicates that the quality level of the router 12 is QL-PRTC.

Figures 3, 4:
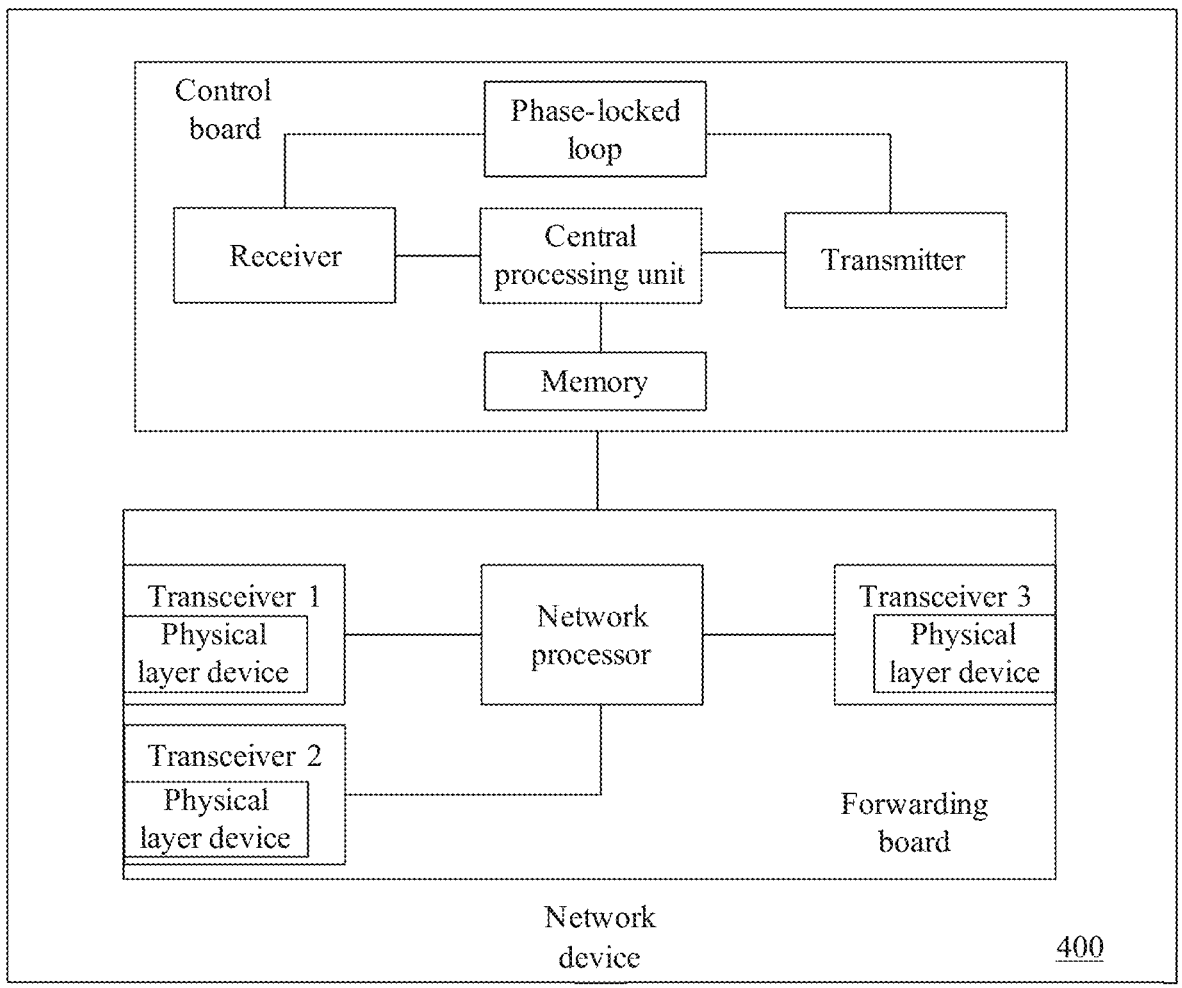
FIG. 3 is a schematic flowchart of a method for synchronizing a network device.
FIG. 4 is a schematic structural diagram of a network device.

FIG. 3 is a schematic flowchart of a method for synchronizing a network device according to an embodiment. The method includes S301 and S302. The method shown in FIG. 3 may be performed by a network device. The network device may be a router, a network switch, a firewall, a load balancer, a base station, a packet transport network (PTN) device, a serving General Packet Radio Service (GPRS) support node (SGSN), a gateway GPRS support node (GGSN), a radio network controller (RNC), or a base station controller (BSC). The network device may include a slave clock. The slave clock may be a synchronous Ethernet equipment slave clock. For the synchronous Ethernet equipment slave clock, refer to Recommendation ITU-T G.8262/Y.1362, 2007. It may be understood that an operation related to a clock signal and performed by the network device is actually performed by the slave clock. For example, the slave clock may process a received SSM to determine a to-be-tracked clock source. In addition, after the to-be-tracked clock source is determined, the slave clock may calibrate a frequency of the slave clock based on timing information from the clock source. The calibrating a frequency of the slave clock may specifically include: generating, by a phase-locked loop of the slave clock, a periodic output signal based on the timing information, where a phase of the periodic output signal is the same as a phase of a periodic input signal included in the timing information. The periodic output signal is an output signal of the phase-locked loop. The periodic input signal is an input signal of the phase-locked loop.

FIG. 4 is a schematic structural diagram of a specific implementation of the network device. Referring to FIG. 4, a network device 400 may include a control board and a forwarding board. The control board may be coupled to the forwarding board by using a control channel. The receiver and the transmitter may be integrated or discrete. The control board includes the receiver, the transmitter, a central processing unit, a memory, and a phase-locked loop. The receiver may receive a signal from the forwarding board by using the control channel. The transmitter may send information to the forwarding board by using the control channel. The receiver is coupled to the central processing unit. The receiver is coupled to the phase-locked loop. The phase-locked loop is coupled to the transmitter. The central processing unit is coupled to the transmitter. The central processing unit is coupled to the memory. The memory stores a computer program. The central processing unit may execute the computer program. The forwarding board includes a transceiver 1, a transceiver 2, a network processor, and a transceiver 3. The transceiver 1 is coupled to the network processor. The transceiver 2 is coupled to the network processor. The network processor is coupled to the transceiver 3. The transceiver 1 includes a physical layer device. The transceiver 2 includes a physical layer device. The transceiver 3 includes a physical layer device.

For example, specifically, the router 13 shown in FIG. 2 may be the network device shown in FIG. 4. Specifically, the port 1 of the router 13 may be located on the transceiver 1. Specifically, the port 2 of the router 13 may be located on the transceiver 2. Specifically, the port 3 of the router 13 may be located on the transceiver 3.

S301. The network device receives a first SSM and a second SSM.

The first SSM carries a first SSM code for indicating a quality level of a first clock source and a first eSSM code for indicating the quality level of the first clock source. The second SSM carries a second SSM code for indicating a quality level of a second clock source and a second eSSM code for indicating the quality level of the second clock source.

S302. When a value of the first SSM code is less than a value of the second SSM code, the network device calibrates a frequency of the network device based on a timing signal of the first clock source.

For example, the network device may include a synchronous Ethernet equipment slave clock. The network device may receive the first SSM and the second SSM through different ports. A device sending the first SSM is referred to as a first device below, and a device sending the second SSM is referred to as a second device below. The first device may be a device that supports both G.8264/Y.1364 and G.8264/Y.1364 Amendment 2. When the first device tracks another device, the first clock source is a device tracked by the first device. When the first device is a free running clock, the first clock source is the first device. The first device supports G.8264/Y.1364, and therefore the first SSM sent by the first device carries the first SSM code. The first device supports G.8264/Y.1364 Amendment 2, and therefore the first SSM sent by the first device carries the first eSSM code.

The second device may be a device that supports both G.8264/Y.1364 and G.8264/Y.1364 Amendment 2. When the second device tracks another device, the second clock source is a device tracked by the second device. When the second device is a free running clock, the second clock source is the second device. The second device supports G.8264/Y.1364, and therefore the second SSM sent by the second device carries the second SSM code. The second device supports G.8264/Y.1364 Amendment 2, and therefore the second SSM sent by the second device carries the second eSSM code for indicating the quality level of the second clock source.

For example, the network device receives the first SSM and the second SSM by using an Ethernet synchronization messaging channel (ESMC). For the ESMC, refer to the description of the ESMC in G.8264/Y.1364.

The first SSM or the second SSM may be an ESMC protocol data unit (PDU). For a format of the ESMC PDU, refer to Table 11-3 in G.8264/Y.1364. The ESMC PDU may include an extended QL TLV and a QL TLV. The QL TLV may include an SSM code. That is, the first SSM code or the second SSM code is carried in the QL TLV. For a format of the QL TLV, refer to Table 11-4 in G.8264/Y.1364. The extended QL TLV may include an enhanced SSM code. That is, the first eSSM code or the second eSSM code is carried in the extended QL TLV. For a format of the extended QL TLV, refer to Table 11-4.2 in G.8264/Y.1364 Amendment 2.

The value of the first SSM code is less than the value of the second SSM code. To be specific, if the network device supports only G.8264/Y.1364 and does not support G.8264/Y.1364 Amendment 2, the network device determines, based on a fact that the value of the first SSM code is less than the value of the second SSM code, that the quality level of the first clock source is higher than the quality level of the second clock source.

G.8264/Y.1364 defines a set of clock quality levels. For example, the clock quality levels defined by G.8264/Y.1364 include QL-PRC, QL-SSU-A, QL-SSU-B, QL-SEC, and QL-DNU. For QL-PRC, QL-SSU-A, QL-SSU-B, QL-SEC, and QL-DNU, refer to G.781 and G.8264. In addition, according to G.8264/Y.1364, a smaller value of an SSM code corresponds to a higher quality level of a clock source.

When the value of the first SSM code is less than the value of the second SSM code, the quality level of the first clock source is higher than the quality level of the second clock source. Therefore, in comparison with tracking the second clock source, the network device can obtain a frequency with higher precision by tracking the first clock source.

In addition, G.8264/Y.1364 Amendment 2 defines an eSSM code. When a quality level of a clock source is a clock quality level defined by G.781, a value of an eSSM code for indicating the quality level of the clock source is equal to 0xFF. For example, assuming that the quality level of the first clock source is QL-EEC1 and the quality level of the second clock source is QL-PRC, a value of an SSM code corresponding to the first clock source is equal to 0xB, and a value of an SSM code corresponding to the second clock source is equal to 0x2. A value of an eSSM code corresponding to the first clock source is equal to 0xFF, and a value of an eSSM code corresponding to the second clock source is equal to 0xFF. To be specific, if the network device supports only G.8264/Y.1364 and does not support G.8264/Y.1364 Amendment 2, the network device determines, based on a fact that the value of the first SSM code is greater than the value of the second SSM code, that the quality level of the first clock source is lower than the quality level of the second clock source. However, if the network device supports only specification of the eSSM code in G.8264/Y.1364 Amendment 2 and does not support a specification of the SSM code in G.8264/Y.1364, the network device determines, based on a fact that a value of the first eSSM code is equal to a value of the second eSSM code, that the quality level of the first clock source is the same as the quality level of the second clock source. To be specific, although quality levels of the first clock source and the second clock source are actually different, if determining is based only on the values of the eSSM codes, the quality levels of the first clock source and the second clock source are the same.

Based on the foregoing analysis, when the value of the first SSM code is different from the value of the second SSM code, in comparison with determining a to-be-tracked clock source based on the values of the eSSM codes, the network device can track a clock source with higher precision by determining a to-be-tracked clock source based on the values of the SSM codes. Specifically, when the value of the first SSM code is less than the value of the second SSM code, it is determined that a clock source corresponding to an SSM code having a smaller value, that is, the first clock source, is the to-be-tracked clock source, so that the network device can track a clock source with higher precision.

The following describes the method shown in FIG. 3 by using an example with reference to FIG. 2 and FIG. 4.

The network device related to the method shown in FIG. 3 may be the network device 400. The network device 400 shown in FIG. 4 may be the router 13 in FIG. 2. The first clock source is the router 12. The second clock source is the router 15. The port 1 and the port 2 are located on the transceiver 1 and the transceiver 2, respectively. The first SSM may be an ESMC PDU that is sent by the router 12 and that is received by the router 13 through the port 1. The second SSM may be an ESMC PDU that is sent by the router 15 and that is received by the router 13 through the port 2. The router 15 supports G.8264/Y.1364 and G.8264/Y.1364 Amendment 2. The router 15 is a free running clock, and an SSM code included in the ESMC PDU sent by the router 15 indicates the quality level of the second clock source (the router 15). For example, a value of the SSM code is 0xB. The quality level of the router 15 is QL-EEC1. The router 15 supports G.8264/Y.1364 Amendment 2, and a value of an eSSM code included in the SSM sent by the router 15 is equal to 0xFF. The router 12 supports G.8264/Y.1364 and G.8264/Y.1364 Amendment 2. When the router 12 does not track the router 11, the router 12 is a free running clock. An SSM code included in the ESMC PDU sent by the router 12 indicates the quality level of the first clock source (the router 12). A value of the SSM code is 0x4, which indicates that the quality level of the router 12 is QL-SSU-A. The router 12 supports G.8264/Y.1364 Amendment 2, and a value of an eSSM code included in the ESMC PDU sent by the router 12 is 0xFF.

After the transceiver 1 receives an Ethernet frame that includes the ESMC PDU and that is sent by the router 12, the network processor may parse the Ethernet frame, to determine that the Ethernet frame includes the ESMC PDU. The network processor sends the ESMC PDU to the control board by using the control channel. After receiving the ESMC PDU, the receiver of the control board sends the ESMC PDU to the central processing unit. The central processing unit determines that quality level information carried in the ESMC PDU is quality level information of the router 12. The central processing unit may determine that the port 1 corresponding to the transceiver 1 is a port for receiving timing information sent by the router 12.

After the transceiver 1 receives an Ethernet frame that includes the ESMC PDU and that is sent by the router 15, the network processor may parse the Ethernet frame, to determine that the Ethernet frame includes the ESMC PDU. The network processor sends the ESMC PDU to the control board by using the control channel. After receiving the ESMC PDU, the receiver of the control board sends the ESMC PDU to the central processing unit. The central processing unit may determine that quality level information carried in the ESMC PDU is quality level information of the router 15. The central processing unit may determine that the port 2 corresponding to the transceiver 2 is a port for receiving timing information sent by the router 15.

In addition, the memory stores a computer program or code for executing G.8264/Y.1364 and G.8264/Y.1364 Amendment 2.

The central processing unit may perform the following operations by executing the computer program or the code. The central processing unit parses the ESMC PDUs sent by the router 12 and by the router 15, to obtain an SSM code and an eSSM code for indicating the quality level of the router 12 and obtain an SSM code and an eSSM code for indicating the quality level of the router 15. By comparing a value of the SSM code for indicating the quality level of the router 12 with a value of the SSM code for indicating the quality level of the router 15, it is determined that the value of the SSM code for indicating the quality level of the router 12 is less than the value of the SSM code for indicating the quality level of the router 15. Based on a fact that the value of the SSM code for indicating the quality level of the router 12 is less than the value of the SSM code for indicating the quality level of the router 15, it is determined that the quality level of the router 12 is higher than that of the router 15. The central processing unit configures the transceiver 1, so that the port 1 sends the received timing information of the router 12 to the control board by using the control channel.

In a possible implementation, the first clock source is the router 11. The second clock source is the router 14. The first SSM may be an ESMC PDU that is sent by the router 12 and that is received by the router 13 through the port 1. The second SSM may be an ESMC PDU that is sent by the router 15 and that is received by the router 13 through the port 2. The router 15 supports G.8264/Y.1364 and G.8264/Y.1364 Amendment 2. The router 15 tracks time and a frequency of the router 14. An SSM code included in the ESMC PDU sent by the router 15 indicates the quality level of the second clock source (the router 14). For example, a value of the SSM code is 0x4. The quality level of the router 14 is QL-SSU-A. The router 15 supports G.8264/Y.1364 Amendment 2, and a value of an eSSM code included in the SSM sent by the router 15 is equal to 0xFF. The router 12 supports G.8264/Y.1364 and G.8264/Y.1364 Amendment 2. The router 12 tracks time and a frequency of the router 11. An SSM code included in the ESMC PDU sent by the router 12 indicates the quality level of the first clock source (the router 11). A value of the SSM code is 0x2, which indicates that the quality level of the router 11 is QL-PRC. Because the router 12 supports G.8264/Y.1364 Amendment 2, a value of an eSSM code included in the ESMC PDU sent by the router 12 is 0xFF.

After the transceiver 1 receives an Ethernet frame that includes the ESMC PDU and that is sent by the router 12, the network processor may parse the Ethernet frame, to determine that the Ethernet frame includes the ESMC PDU. The network processor sends the ESMC PDU to the control board by using the control channel. After receiving the ESMC PDU, the receiver of the control board sends the ESMC PDU to the central processing unit. The central processing unit determines that quality level information carried in the ESMC PDU is quality level information of the router 11. The central processing unit may determine that the port 1 corresponding to the transceiver 1 is a port for receiving timing information sent by the router 11.

After the transceiver 1 receives an Ethernet frame that includes the ESMC PDU and that is sent by the router 15, the network processor may parse the Ethernet frame, to determine that the Ethernet frame includes the ESMC PDU. The network processor sends the ESMC PDU to the control board by using the control channel. After receiving the ESMC PDU, the receiver of the control board sends the ESMC PDU to the central processing unit. The central processing unit may determine that quality level information carried in the ESMC PDU is quality level information of the router 14. The central processing unit may determine that the port 2 corresponding to the transceiver 2 is a port for receiving timing information sent by the router 14.

In addition, the memory stores a computer program for executing G.8264/Y.1364 and G.8264/Y.1364 Amendment 2. The central processing unit may perform the following operations by executing the computer program. The central processing unit parses the ESMC PDUs sent by the router 12 and by the router 15, to obtain an SSM code and an eSSM code for indicating a quality level of the router 11 and obtain an SSM code for indicating a quality level of the router 14. By comparing a value of the SSM code for indicating the quality level of the router 11 with a value of the SSM code for indicating the quality level of the router 14, it is determined that the value of the SSM code for indicating the quality level of the router 11 is less than the value of the SSM code for indicating the quality level of the router 14. Based on a fact that the value of the SSM code for indicating the quality level of the router 11 is less than the value of the SSM code for indicating the quality level of the router 14, it is determined that the quality level of the router 11 is higher than that of the router 14. The central processing unit configures the transceiver 1, so that the port 1 sends the received timing information of the router 11 to the control board by using the control channel.

Specifically, the transceiver 1 includes the physical layer device. The physical layer device includes a circuit for executing clock recovery. After the transceiver 1 receives a data flow from the router 12, the circuit for executing the clock recovery can obtain timing information from the data flow. For example, the timing information may be a physical timing flow. For the physical timing flow, refer to the description in G.8264/Y.1364. Timing information is a periodic signal. Because the periodic signal is to be input to the phase-locked loop, the periodic signal herein is referred to as a periodic input signal. The transceiver 1 sends the timing information to the control board by using the control channel. Specifically, the receiver sends the timing information to the phase-locked loop. The phase-locked loop generates a periodic output signal based on the timing information, and a phase of the periodic output signal is the same as a phase of the periodic input signal included in the timing information. The control board sends the periodic output signal to the transceiver 3 by using the transmitter. For example, the periodic output signal may be T0. For T0, refer to the description of T0 in Figure A.2 in G.8264/Y.1364. The periodic output signal is a reference clock signal of the transceiver 3. Specifically, the physical layer device in the transceiver 3 processes, based on the reference clock signal, an Ethernet frame provided by the network processor. For example, the physical layer device in the transceiver 3 may perform processing such as physical layer encoding, scrambling, virtual lane distribution, and alignment insertion. After processing the Ethernet frame, the physical layer device in the transceiver 3 may send a data flow to the base station 16 through the port 3.

Optionally, the method shown in FIG. 3 may further include: calibrating, by the network device, the frequency of the network device based on the timing signal of the first clock source when the value of the first SSM code is equal to the value of the second SSM code and the value of the first eSSM code is less than the value of the second eSSM code.

For example, assuming that the quality level of the first clock source is QL-PRTC and the quality level of the second clock source is QL-PRC, the value of the first SSM code is equal to 0x2, and the value of the second SSM code is equal to 0x2. The value of the first eSSM code is equal to 0x20, and the value of the second eSSM code is equal to 0xFF. That is, when the value of the first SSM code is equal to the value of the second SSM code, if determining is based only on the values of the SSM codes, the quality level of the first clock source is equal to the quality level of the second clock source. However, the quality level of the first clock source is actually higher than the quality level of the second clock source.

Therefore, in the foregoing technical solution, when the value of the first SSM code is equal to the value of the second SSM code, the clock source with higher precision can be determined based on the values of the eSSM codes.

Optionally, the method shown in FIG. 3 may further include: calibrating, by the network device, the frequency of the network device based on the timing signal of the first clock source when the value of the first SSM code is equal to the value of the second SSM code, the value of the first eSSM code is equal to the value of the second eSSM code, and a value of the number of cascaded synchronous Ethernet equipment clocks from a nearest synchronization supply unit/primary (reference clock number of cascaded EECs from the nearest SSU/PRC) in the first SSM is less than a value of the number of cascaded EECs from the nearest SSU/PRC in the second SSM.

In the foregoing technical solution, when the value of the first SSM code is equal to the value of the second SSM code and the value of the first eSSM code is equal to the value of the second eSSM code, the network device can select, from a plurality of clock sources, a clock source for calibrating the frequency of the network device, to avoid a failure to determine the clock source. For example, the failure to determine the clock source may result in low precision of a clock of the network device, and may even result in a service interruption of the network device.

Optionally, the method shown in FIG. 3 may further include: calibrating, by the network device, the frequency of the network device based on the timing signal of the first clock source when the value of the first SSM code is equal to the value of the second SSM code, the value of the first eSSM code is equal to the value of the second eSSM code, a value of the number of cascaded synchronous Ethernet equipment clocks from the nearest synchronization supply unit/primary reference clock in the first SSM is equal to a value of the number of cascaded synchronous Ethernet equipment clocks from the nearest synchronization supply unit/primary reference clock in the first SSM, and a value of the number of cascaded eEECs from the nearest SSU/PRC in the first SSM is less than a value of the number of cascaded eEECs from the nearest SSU/PRC in the second SSM.

Optionally, in the foregoing technical solution, the method may further include: calibrating, by the network device, the frequency of the network device based on the timing signal of the first clock source when the value of the first SSM code is equal to the value of the second SSM code, the value of the first eSSM code is equal to the value of the second eSSM code, the value of the number of cascaded synchronous Ethernet equipment clocks from the nearest synchronization supply unit/primary reference clock in the first SSM is equal to the value of the number of cascaded synchronous Ethernet equipment clocks from the nearest synchronization supply unit/primary reference clock in the second SSM, a value of the number of cascaded eEECs from the nearest SSU/PRC in the first SSM is equal to a value of the number of cascaded enhanced synchronous Ethernet equipment clocks from the nearest synchronization supply unit/primary reference clock in the second SSM, and a value of a synchronous Ethernet master identity SyncE Master ID in the first SSM is less than a value of a synchronous Ethernet master identity SyncE Master ID in the second SSM.

For example, in the foregoing technical solution, the network device is a synchronous Ethernet equipment clock or a synchronous optical transport network equipment clock.

Figure 5:
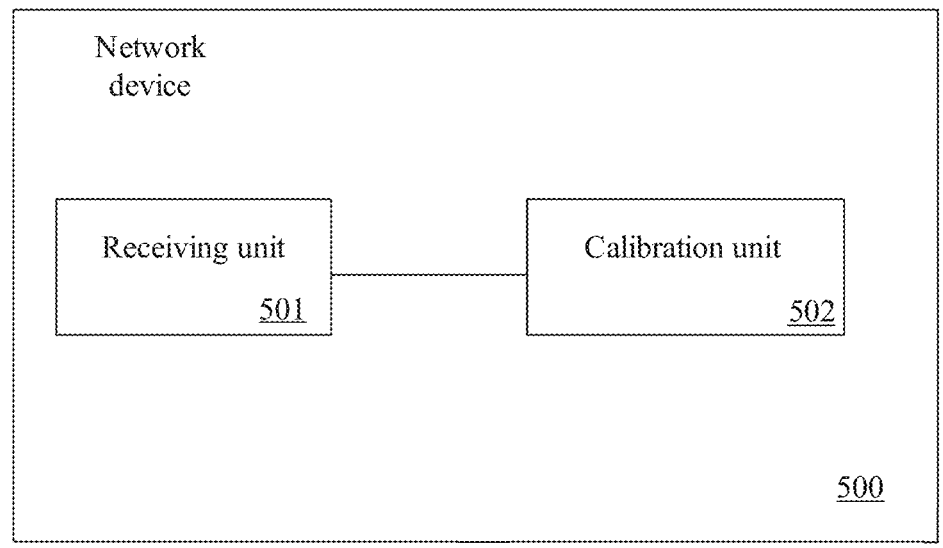
FIG. 5 is a schematic structural diagram of a network device.

FIG. 5 is a schematic structural diagram of a network device 500. Referring to FIG. 5, the network device includes a receiving unit 501 and a calibration unit 502. For example, the network device 500 may be specifically the network device shown in FIG. 4. For a specific implementation of the network device 500, refer to the description in the embodiment corresponding to FIG. 4. The network device 500 may perform the method shown in FIG. 3. For a specific implementation of the network device 500, refer to the description in the embodiment corresponding to FIG. 3.

The receiving unit 501 is configured to receive a first SSM and a second SSM.

The first SSM carries a first SSM code for indicating a quality level of a first clock source and a first eSSM code for indicating the quality level of the first clock source, and the second SSM carries a second SSM code for indicating a quality level of a second clock source and a second eSSM code for indicating the quality level of the second clock source.

For example, the receiving unit 501 may be configured to perform S301. For a specific implementation of the receiving unit 501, refer to the description of S301 in the embodiment shown in FIG. 3.

For example, the receiving unit 501 may specifically include the transceiver 1 and the transceiver 2 in FIG. 4. For example, the network device 500 may be the router 13 in FIG. 2. The router 13 may receive, through the port 1, the first SSM sent by the router 12, and may receive, through the port 2, the second SSM sent by the router 15.

The calibration unit 502 is configured to: calibrate a frequency of the network device based on a timing signal of the first clock source when a value of the first SSM code is less than a value of the second SSM code.

For example, the calibration unit 502 may be configured to perform S302. For a specific implementation of the calibration unit 502, refer to the description of S302 in the embodiment shown in FIG. 3.

For example, the calibration unit 502 may include the phase-locked loop in FIG. 4. The phase-locked loop may receive the timing signal of the first clock source by using the transceiver 1. The calibrating a frequency of the network device based on a timing signal of the first clock source may be specifically generating a system clock signal based on the timing signal of the first clock source. A frequency of the system clock signal is equal to a frequency of the timing signal of the first clock source. The system clock signal can drive a component in the network device. For example, the component in the network device may be an interface board or a physical layer device. An operation of determining that the value of the first SSM code is less than the value of the second SSM code may be performed by the central processing unit in FIG. 4.

Optionally, the calibration unit 502 is further configured to: calibrate the frequency of the network device based on the timing signal of the first clock source when the value of the first SSM code is equal to the value of the second SSM code and a value of the first eSSM code is less than a value of the second eSSM code.

Optionally, the calibration unit 502 is further configured to: calibrate the frequency of the network device based on the timing signal of the first clock source when the value of the first SSM code is equal to the value of the second SSM code, the value of the first eSSM code is equal to the value of the second eSSM code, and a value of the number of cascaded synchronous Ethernet equipment clocks from a nearest synchronization supply unit/primary (reference clock number of cascaded EECs from the nearest SSU/PRC) in the first SSM is less than a value of the number of cascaded synchronous Ethernet equipment clocks from the nearest synchronization supply unit/primary reference clock in the second SSM.

Optionally, the calibration unit 502 is further configured to: calibrate the frequency of the network device based on the timing signal of the first clock source when the value of the first SSM code is equal to the value of the second SSM code, the value of the first eSSM code is equal to the value of the second eSSM code, the value of the number of cascaded synchronous Ethernet equipment clocks from the nearest synchronization supply unit/primary reference clock in the first SSM is equal to the value of the number of cascaded synchronous Ethernet equipment clocks from the nearest synchronization supply unit/primary reference clock in the second SSM, and a value of the number of cascaded enhanced synchronous Ethernet equipment clocks from the nearest synchronization supply unit/primary (reference clock number of cascaded eEECs from the nearest SSU/PRC) in the first SSM is less than a value of the number of cascaded enhanced synchronous Ethernet equipment clocks from the nearest synchronization supply unit/primary reference clock in the second SSM.

Optionally, the calibration unit 502 is further configured to calibrate the frequency of the network device based on the timing signal of the first clock source when the value of the first SSM code is equal to the value of the second SSM code, the value of the first eSSM code is equal to the value of the second eSSM code, the value of the number of cascaded synchronous Ethernet equipment clocks from the nearest synchronization supply unit/primary reference clock in the first SSM is equal to the value of the number of cascaded synchronous Ethernet equipment clocks from the nearest synchronization supply unit/primary reference clock in the second SSM, the value of the number of cascaded enhanced synchronous Ethernet equipment clocks from the nearest synchronization supply unit/primary (reference clock number of cascaded eEECs from the nearest SSU/PRC) in the first SSM is equal to the value of the number of cascaded enhanced synchronous Ethernet equipment clocks from the nearest synchronization supply unit/primary reference clock in the second SSM, and a value of a synchronous Ethernet master identity SyncE Master ID in the first SSM is less than a value of a synchronous Ethernet master identity SyncE Master ID in the second SSM.

Optionally, the network device 500 is a synchronous Ethernet equipment clock or a synchronous optical transport network equipment clock.

Figure 6:
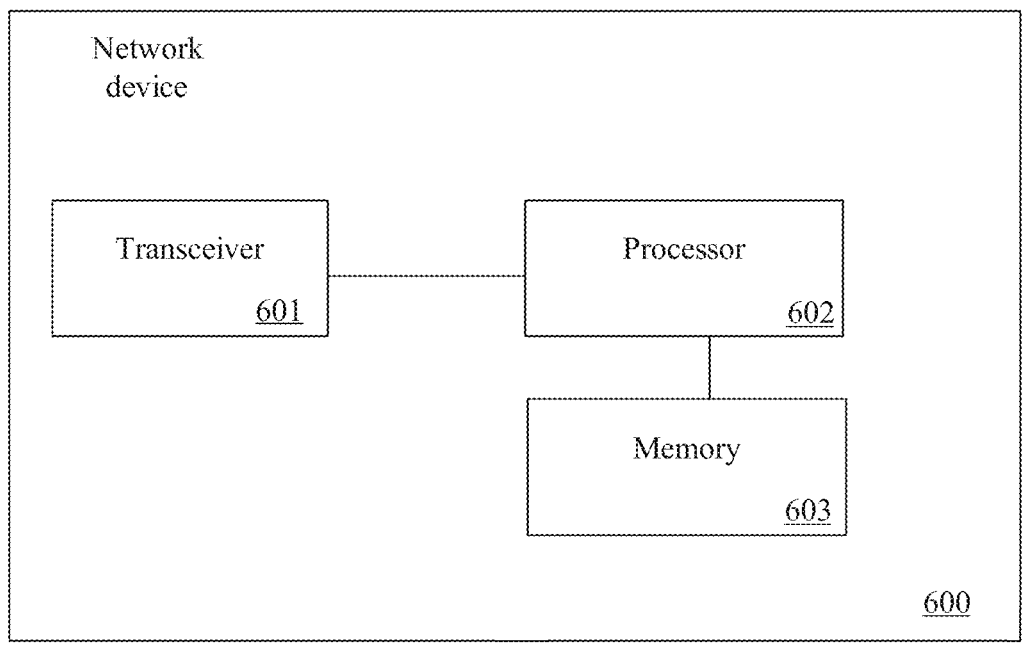
FIG. 6 is a schematic structural diagram of a network device.

FIG. 6 is a schematic structural diagram of a network device. The network device 600 includes a transceiver 601, a processor 602, and a memory 603. The transceiver 601 is coupled to the processor 602, and the processor 602 is coupled to the memory 603. The memory 603 stores a computer program.

The transceiver 601 is configured to receive a first SSM and a second SSM.

The first SSM carries a first SSM code for indicating a quality level of a first clock source and a first eSSM code for indicating the quality level of the first clock source, and the second SSM carries a second SSM code for indicating a quality level of a second clock source and a second eSSM code for indicating the quality level of the second clock source.

When the computer program in the memory 603 is executed by the processor 602 or another device or another component of the network device, the processor 602 is enabled to calibrate a frequency of the network device 600 based on a timing signal of the first clock source when a value of the first SSM code is less than a value of the second SSM code.

For example, the network device 600 may be the network device 500 shown in FIG. 5. The network device 600 may perform the method shown in FIG. 3. The network device 600 may be the network device 400 shown in FIG. 4. The network device 600 may be the router 13 shown in FIG. 2.

For example, the transceiver 601 may be configured to perform S301. For a specific implementation of the transceiver 601, refer to the description of S301 in the embodiment shown in FIG. 3. For example, the transceiver 601 may include the transceiver 1 and the transceiver 2 in the network device 400 shown in FIG. 4.

For example, the processor 602 may be configured to perform S302. For a specific implementation of the processor 602, refer to the description of S302 in the embodiment shown in FIG. 3. For example, the processor 602 may include the central processing unit and the phase-locked loop in FIG. 4. The central processing unit is configured to determine that the value of the first SSM code is less than the value of the second SSM code. The phase-locked loop is configured to calibrate the frequency of the network device 600. The central processing unit may be further configured to determine that the first clock source is a clock source that needs to be tracked by the network device 600. The memory 603 may include the memory in FIG. 4.

Figure 7:
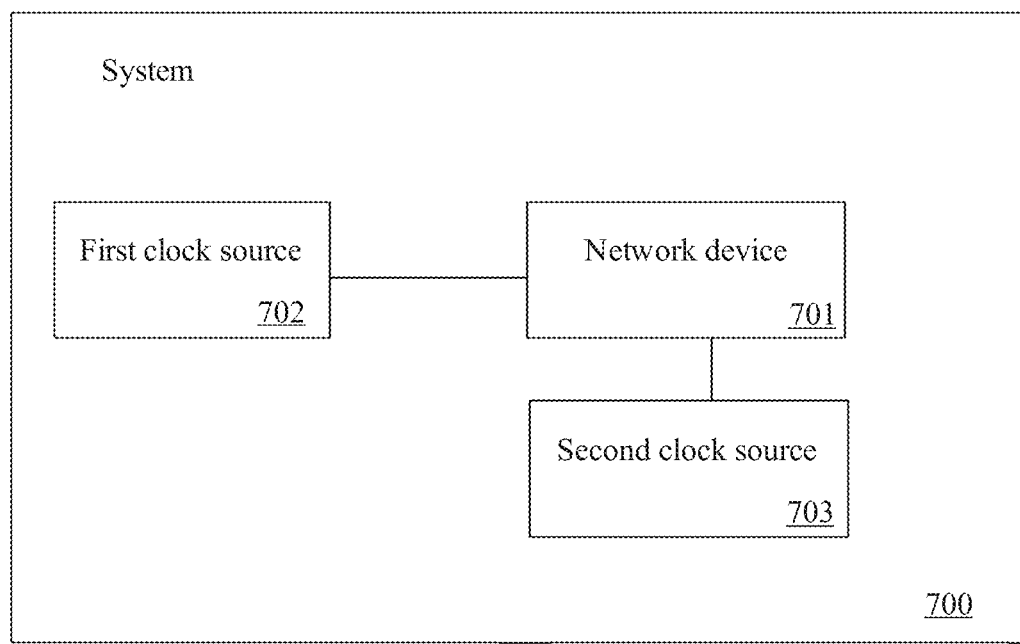
FIG. 7 is a schematic structural diagram of a system.

FIG. 7 is a schematic structural diagram of a system. Referring to FIG. 7, a system 700 includes a network device 701, a first clock source 702, and a second clock source 703. The network device 701 may be the network device 600 shown in FIG. 6, the network device 500 shown in FIG. 5, or the network device 400 shown in FIG. 4. The network device 701 may perform the method shown in FIG. 3. For a specific implementation of the network device 701, refer to the descriptions in the embodiments corresponding to FIG. 3, FIG. 4, FIG. 5, and FIG. 6. Details are not described herein.

In addition, the system 700 shown in FIG. 7 may be applied to the network shown in FIG. 2. For example, the first clock source 702 may be a router 11. The second clock source 703 may be a router 15. The network device 701 may be a router 13. The router 11 is a clock source of the router 12. The router 12 tracks a frequency of the router 11. The router 15 does not track a router 14. The router 15 is a free running clock. For a specific implementation in which the system 700 shown in FIG. 7 is applied to the network shown in FIG. 2, refer to the description in the embodiment corresponding to FIG. 2.

This disclosure provides a computer program product. The computer program product is stored in a non-volatile computer readable storage medium or a volatile computer readable storage medium. When the computer program is executed by a processor, or another device or component, the processor is configured to perform the method shown in FIG. 3.

It should be understood that sequence numbers of the foregoing processes do not mean execution sequences in various embodiments. The execution sequences of the processes should be determined by functions and internal logic of the processes, and should not be construed as any limitation on the implementation processes of the embodiments.

A person of ordinary skill in the art may be aware that, in combination with the examples described in the embodiments disclosed in this specification, units and steps may be implemented by electronic hardware or a combination of computer software and electronic hardware. Whether the functions are performed by hardware or a combination of software and electronic hardware depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of electronic hardware and software.

When the integrated unit is implemented in the form of a software functional unit and sold or used as an independent product, the integrated unit may be stored in a computer-readable storage medium. Based on such an understanding, the technical solutions essentially, or some of the technical solutions may be implemented in a form of a software product. The computer software product is stored in a storage medium, and includes several instructions for instructing a processor or a computer device (which may be a personal computer, a server, a network device, or the like) to perform all or some of the steps of the methods described in the embodiments. The foregoing storage medium includes: any medium that can store program code, such as a USB flash drive, a removable hard disk, a read-only memory (ROM), a random-access memory (RAM), a magnetic disk, or an optical disc.

What is claimed is:

1. A method implemented by a network device and comprising:
receiving a first synchronization status message (SSM) and a second SSM, wherein the first SSM carries a first SSM code for indicating a first quality level of a first clock source and a first enhanced SSM (eSSM) code for indicating the first quality level, and wherein the second SSM carries a second SSM code for indicating a second quality level of a second clock source and a second eSSM code for indicating the second quality level; and
calibrating a frequency of the network device based on a timing signal of the first clock source when a first value of the first SSM code is less than a second value of the second SSM code.

2. The method of claim 1, further comprising calibrating the frequency based on the timing signal when the first value is equal to the second value and a third value of the first eSSM code is less than a fourth value of the second eSSM code.

3. The method of claim 1, further comprising calibrating the frequency based on the timing signal when the first value is equal to the second value, a third value of the first eSSM code is equal to a fourth value of the second eSSM code, and a first number of cascaded synchronous Ethernet equipment clocks (EECs) from a first nearest synchronization supply unit/primary reference clock (SSU/PRC) in the first SSM is less than a second number of cascaded synchronous EECs from a second nearest SSU/PRC in the second SSM.

4. The method of claim 1, further comprising calibrating the frequency based on the timing signal when the first value is equal to the second value, a third value of the first eSSM code is equal to a fourth value of the second eSSM code, a first number of cascaded synchronous Ethernet equipment clocks (EECs) from a first nearest synchronization supply unit/primary reference clock (SSU/PRC) in the first SSM is equal to a second number of cascaded synchronous EECs from a second nearest SSU/PRC in the second SSM, and a third number of cascaded enhanced synchronous EECs from the first nearest SSU/PRC is less than a fourth number of cascaded enhanced synchronous EECs from the second nearest SSU/PRC.

5. The method of claim 1, further comprising calibrating the frequency based on the timing signal when the first value is equal to the second value, a third value of the first eSSM code is equal to a fourth value of the second eSSM code, a first number of cascaded synchronous Ethernet equipment clocks (EECs) from a first nearest synchronization supply unit/primary reference clock (SSU/PRC) in the first SSM is equal to a second number of cascaded synchronous EECs from a second nearest SSU/PRC in the second SSM, a third number of cascaded enhanced synchronous EECs from the first nearest SSU/PRC is equal to a fourth number of cascaded enhanced synchronous EECs from the second nearest SSU/PRC, and a fifth value of a synchronous Ethernet master identity (SyncE master ID) in the first SSM is less than a sixth value of a SyncE master ID in the second SSM.

6. The method of claim 1, wherein the first quality level is one of quality level—primary reference clock (QL-PRC), quality level—type I or V slave clock (QL-SSU-A), quality level—type VI slave clock (QL-SSU-B), quality level—synchronous equipment clock (QL-SEC), or quality level—do not use (QL-DNU).

7. The method of claim 6, wherein the second quality level is one of QL-PRC, QL-SSU-A, QL-SSU-B, QL-SEC, or QL-DNU.

8. A network device comprising:
a memory configured to store instructions; and
a processor coupled to the memory and configured to execute the instructions to:
receive a first synchronization status message (SSM) and a second SSM, wherein the first SSM carries a first SSM code for indicating a first quality level of a first clock source and a first enhanced SSM (eSSM) code for indicating the first quality level, and wherein the second SSM carries a second SSM code for indicating a second quality level of a second clock source and a second eSSM code for indicating the second quality level; and calibrate a frequency of the network device based on a timing signal of the first clock source when a first value of the first SSM code is less than a second value of the second SSM code.

9. The network device of claim 8, wherein the processor is further configured to calibrate the frequency based on the timing signal when the first value is equal to the second value and a third value of the first eSSM code is less than a fourth value of the second eSSM code.

10. The network device of claim 8, wherein the processor is further configured to calibrate the frequency based on the timing signal when the first value is equal to the second value, a third value of the first eSSM code is equal to a fourth value of the second eSSM code, and a first number of cascaded synchronous Ethernet equipment clocks (EECs) from a first nearest synchronization supply unit/primary reference clock (SSU-PRC) in the first SSM is less than a second number of cascaded synchronous EECs from a second nearest SSU/PRC in the second SSM.

11. The network device of claim 8, wherein the processor is further configured to calibrate the frequency based on the timing signal when the first value is equal to the second value, a third value of the first eSSM code is equal to a fourth value of the second eSSM code, a first number of cascaded synchronous Ethernet equipment clocks (EECs) from a first nearest synchronization supply unit/primary reference clock (SSU/PRC) in the first SSM is equal to a second number of cascaded synchronous EECs from a second nearest SSU/PRC in the second SSM, and a third number of cascaded enhanced synchronous EECs from the first nearest SSU/PRC is less than a fourth number of cascaded enhanced synchronous EECs from the second nearest SSU/PRC.

12. The network device of claim 8, wherein the processor is further configured to calibrate the frequency based on the timing signal when the first value is equal to the second value, a third value of the first eSSM code is equal to a fourth value of the second eSSM code, a first number of cascaded synchronous Ethernet equipment clocks (EECs) from a first nearest synchronization supply unit/primary reference clock (SSU/PRC) in the first SSM is equal to a second number of cascaded synchronous EECs from a second nearest SSU/PRC in the second SSM, a third number of cascaded enhanced synchronous EECs from the first nearest SSU/PRC is equal to a fourth number of cascaded enhanced synchronous EECs from the second nearest SSU/PRC, and a fifth value of a synchronous Ethernet master identity (SyncE master ID) in the first SSM is less than a sixth value of a SyncE master ID in the second SSM.

13. The network device of claim 8, wherein the first quality level is one of quality level—primary reference clock (QL-PRC), quality level—type I or V slave clock (QL-SSU-A), quality level—type VI slave clock (QL-SSU-B), quality level-synchronous equipment clock (QL-SEC), or quality level—do not use (QL-DNU).

14. The network device of claim 13, wherein the second quality level is one of QL-PRC, QL-SSU-A, QL-SSU-B, QL-SEC, or QL-DNU.

15. A computer program product comprising instructions for storage on a non-transitory medium and that, when executed by a processor, cause a network device to:

receive a first synchronization status message (SSM) and a second SSM, wherein the first SSM carries a first SSM code for indicating a first quality level of a first clock source and a first enhanced SSM (eSSM) code for indicating the first quality level, and wherein the second SSM carries a second SSM code for indicating a second quality level of a second clock source and a second eSSM code for indicating the second quality level; and calibrate a frequency of the network device based on a timing signal of the first clock source when a first value of the first SSM code is less than a second value of the second SSM code.

16. The computer program product of claim 15, wherein the instructions further cause the network device to calibrate the frequency based on the timing signal when the first value is equal to the second value and a third value of the first eSSM code is less than a fourth value of the second eSSM code.

17. The computer program product of claim 15, wherein the instructions further cause the network device to calibrate the frequency based on the timing signal when the first value is equal to the second value, a third value of the first eSSM code is equal to a fourth value of the second eSSM code, and a first number of cascaded synchronous Ethernet equipment clocks (EECs) from a first nearest synchronization supply unit/primary reference clock (SSU/PRC) in the first SSM is less than a second number of cascaded synchronous EECs from a second nearest SSU/PRC in the second SSM.

18. The computer program product of claim 15, wherein the instructions further cause the network device to calibrate the frequency based on the timing signal when the first value is equal to the second value, a third value of the first eSSM code is equal to a fourth value of the second eSSM code, a first number of cascaded synchronous Ethernet equipment clocks (EECs) from a first nearest synchronization supply unit/primary reference clock (SSU/PRC) in the first SSM is equal to a second number of cascaded synchronous EECs from a second nearest SSU/PRC in the second SSM, and a third number of cascaded enhanced synchronous EECs from the first nearest SSU/PRC is less than a fourth number of cascaded enhanced synchronous EECs from the second nearest SSU/PRC.

19. The computer program product of claim 15, wherein the instructions further cause the network device to calibrate the frequency based on the timing signal when the first value is equal to the second value, a third value of the first eSSM code is equal to a fourth value of the second eSSM code, a first number of cascaded synchronous Ethernet equipment clocks (EECs) from a first nearest synchronization supply unit/primary reference clock (SSU/PRC) in the first SSM is equal to a second number of cascaded synchronous EECs from a second nearest SSU/PRC in the second SSM, a third number of cascaded enhanced synchronous EECs from the first nearest SSU/PRC is equal to a fourth number of cascaded enhanced synchronous EECs from the second nearest SSU/PRC, and a fifth value of a synchronous Ethernet master identity (SyncE master ID) in the first SSM is less than a sixth value of a SyncE master ID in the second SSM.

20. The computer program product of claim 15, wherein the first quality level is one of quality level—primary reference clock (QL-PRC), quality level—type I or V slave clock (QL-SSU-A), quality level—type VI slave clock (QL-SSU-B), quality level—synchronous equipment clock (QL-SEC), or quality level—do not use (QL-DNU), and wherein the second quality level is one of QL-PRC, QL-SSU-A, QL-SSU-B, QL-SEC, or QL-DNU.

\* \* \* \* \*